(12) United States Patent
Karatay et al.

(10) Patent No.: US 11,876,268 B2
(45) Date of Patent: Jan. 16, 2024

(54) POLYMER ELECTROLYTE MEMBRANE WITH PLATELETS

(71) Applicant: Palo Alto Research Center Incorporated, Palo Alto, CA (US)

(72) Inventors: Elif Karatay, Mountain View, CA (US); Kathryn F. Murphy, Redwood City, CA (US); Mahati Chintapalli, Mountain View, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/358,168

(22) Filed: Jun. 25, 2021

(65) Prior Publication Data
US 2022/0416283 A1    Dec. 29, 2022

(51) Int. Cl.
| | |
|---|---|
| *H01M 8/10* | (2016.01) |
| *H01M 8/1067* | (2016.01) |
| *H01M 8/1004* | (2016.01) |
| *H01M 8/1041* | (2016.01) |
| *H01M 8/1039* | (2016.01) |
| *H01M 8/1081* | (2016.01) |

(52) U.S. Cl.
CPC ....... *H01M 8/1067* (2013.01); *H01M 8/1004* (2013.01); *H01M 8/1039* (2013.01); *H01M 8/1041* (2013.01); *H01M 8/1081* (2013.01); *H01M 2300/0082* (2013.01); *H01M 2300/0085* (2013.01)

(58) Field of Classification Search
CPC ............. H01M 8/1067; H01M 8/1065; H01M 8/1018; H01M 8/1004; H01M 8/1039; H01M 8/1041; H01M 8/1081; H01M 2300/0082; H01M 2300/0085
See application file for complete search history.

(56) References Cited

U.S. PATENT DOCUMENTS

| | | |
|---|---|---|
| 8,399,145 B2 | 3/2013 | Barnwell et al. |
| 2012/0321995 A1 | 12/2012 | Roof |
| 2020/0212466 A1 | 7/2020 | Murphy |

FOREIGN PATENT DOCUMENTS

WO    WO 2014/126996    *  8/2014   ............. H01M 8/10

OTHER PUBLICATIONS

Prabhakaran, et al., "Investigation of polymer electrolyte membrane chemical degradation and degradation mitigation using in situ fluorescence spectroscopy," PNAS vol. 109(4) pp. 1029-1034 (2012).
Rui, et al., "Understanding of free radical scavengers used in highly durable proton exchange membranes," Progress in Natural Science: Materials International 30 732-742 (2020).
Liu, et al., "Synthesis of Micron-Scale Platelet BaTiO$_3$," Journal of the American Ceramic Society, vol. 90, Issue 4, pp. 1323-1326 (2007) (Abstract only).

* cited by examiner

*Primary Examiner* — Raymond Alejandro
(74) *Attorney, Agent, or Firm* — Lippes Mathias LLP (57) ABSTRACT

A polymer electrolyte membrane includes an ion-conducting polymeric electrolyte material and platelets, distributed through the polymeric electrolyte material. The platelets have an aspect ratio of length to thickness of at least 2:1. The platelets are aligned generally parallel to a length of the membrane. The platelets can be functionalized with free radical scavengers, or other moieties, to extend the lifetime of the membrane or of a membrane electrode assembly incorporating the membrane.

21 Claims, 4 Drawing Sheets

POLYMER ELECTROLYTE MEMBRANE WITH PLATELETS

BACKGROUND

The exemplary embodiment relates to ion exchange membranes and finds particular application in the reduction of gas crossover and degradation by free radicals in membrane electrode assemblies.

Polymer electrolyte membranes (PEMs) are widely used in electrochemical cells, such as water electrolyzers, fuel cells, and flow batteries. A common material for forming proton exchange membranes is a perfluorinated ionomer, such as a perfluorosulfonic acid (PFSA)-modified tetrafluoroethylene, marketed as Nafion™ polymers.

To be useful in proton exchange applications, the proton conductivity of PEMs should be high, and chemical durability, thermal durability and mechanical stability should be sufficient for normal operation. One problem arising in such membranes is gas crossover, in particular, the migration of oxygen and/or hydrogen gas through the membrane. Increasing the membrane thickness is a common remedy to reduce the gas crossover problem, but this adds to the material cost and also increases resistance to proton conduction, resulting in a decrease cell efficiency.

Another problem with PEMs is the migration of free radicals through the membrane. Such free radicals may be generated through reactions occurring at the electrode. These free radicals can reduce the effectiveness of the catalyst layer. They can also chemically degrade the membrane, which leads to thinning of the membrane and pinhole generation. Methods for addressing the chemical degradation include blending free radical scavenger molecules in the polymer membrane, or blending inorganic filler particles, generally metal oxide nanoparticles, in the polymer membrane. However, problems with these approaches include the migration of the metal ions to the catalyst layer, which can poison the catalyst, and coordination of scavenging groups (such as cerium ions) with sulfonic acid groups in the PEMs, resulting in the decrease of proton conductivity and cell performance loss.

INCORPORATION BY REFERENCE

The following references, the disclosures of which are incorporated by reference, are mentioned:

U.S. Pub. No. 20200212466, published Jul. 2, 2020, entitled APPARATUS AND METHOD FOR FORMING A MULTILAYER EXTRUSION COMPRISING COMPONENT LAYERS OF AN ELECTROCHEMICAL CELL, by Murphy, describes forming a multilayer extrusion comprising component layers of an electrochemical cell with a coextrusion die using metallic inks and a polymeric ink.

U.S. Pub. No. 20120321995, published Dec. 20, 2012, entitled SYSTEM AND METHOD FOR SELECTIVE DEPOSITION OF A CATALYST LAYER FOR PEM FUEL CELLS UTILIZING INKJET PRINTING, by Roof, describes a method for forming electrodes on a substrate by inkjet printing.

U.S. Pat. No. 8,399,145, issued Mar. 19, 2013, entitled MEMBRANE ELECTRODE ASSEMBLY, by Barnwell, et al., describes a membrane electrode assembly which includes an edge protection member positioned between a membrane and a gas diffusion layer. The member includes a film layer, a bonding layer, and one or more additives selected from a free radical decomposition catalyst, a self-regenerating antioxidant, hydrogen donors (H-donor) a primary antioxidant, a free radical scavenger secondary antioxidant, oxygen absorbers (oxygen scavenger) and elemental palladium.

BRIEF DESCRIPTION

In accordance with one aspect of the exemplary embodiment, a polymer electrolyte membrane includes an ion-conducting polymeric electrolyte material and platelets, distributed through the polymeric electrolyte material, the platelets having an aspect ratio of length to thickness of at least 2:1. The platelets are aligned generally parallel to a length of the membrane.

In various aspects of the polymer electrolyte membrane:
the platelets are selected for improving one or more of: durability (e.g., manganese oxide) mechanical strength, thermal properties, and water management of the membrane (e.g., via control of swelling, dimensional stability, and the like);
the platelets are functionalized with at least one of radical scavenger groups and ion conductivity promoting groups; and/or
the platelets are functionalized for improving the organic-inorganic interface between the platelets and the membrane matrix.

In accordance with another aspect of the exemplary embodiment, a membrane electrode assembly includes a polymer electrolyte membrane as described above and first and second electrodes, spaced by the membrane.

In accordance with another aspect of the exemplary embodiment, a method of forming a polymer electrolyte membrane includes combining platelets with a polymer in solution to form a dispersion, the platelets having an aspect ratio of length to thickness of at least 2:1, and forming a polymer electrolyte membrane from the dispersion, including applying shear to the dispersion to align the platelets generally parallel to a length of the membrane.

In accordance with another aspect of the exemplary embodiment, a method of forming a membrane electrode assembly includes forming a polymer electrolyte membrane according to the method described above and providing first and second electrodes, spaced by the membrane.

DETAILED DESCRIPTION

Aspects of the exemplary embodiment relate to a Polymer Electrolyte Membrane (PEM), to a membrane electrode assembly (MEA) incorporating the PEM, to an electrochemical device comprising the MEA, to a method of making the MEA, and to a method employing the MEA.

Figure 1:
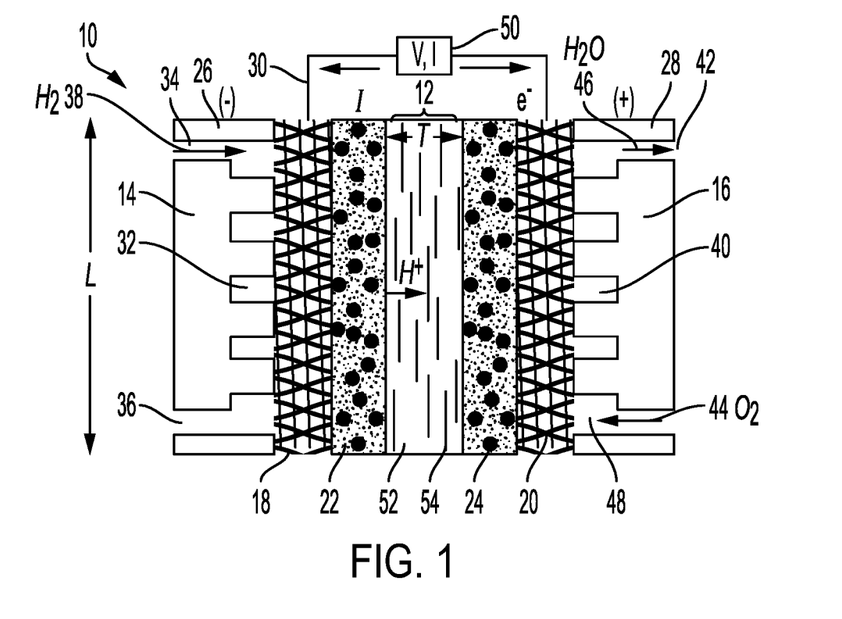
FIG. 1 is a schematic cross sectional view of a membrane electrode assembly in accordance with one aspect of the exemplary embodiment.

With reference to FIG. 1, a membrane electrode assembly 10 is shown in cross-sectional view. The MEA 10 includes a planar polymer electrolyte membrane 12, first and second bipolar plates 14, 16, optional first and second gas diffusion layers 18, 20, first and second catalyst layers 22, 24, and first and second electrodes 26, 28, such as an anode and a cathode. A conductive path 30 electrically connects the first and second electrodes 26, 28, permitting a flow of electrons between the first and second electrodes. In a typical fuel cell system, multiple MEA, such as MEA 10, are electrically connected in a series or parallel configuration, referred to as a fuel cell stack, to generate electrical power at a predetermined current and voltage.

A first chamber 32 is defined by channels between the first bipolar plate 14 and the polymer membrane 12. The first chamber 32 has an inlet port 34 and an outlet port 36, allowing a first fluid 38 to flow through the chamber. A second chamber 40 is defined by channels between the second bipolar plate 16 and the polymer membrane 12. The chamber 40 has an inlet port 42 and an outlet port 44, allowing a second fluid 46 to flow through the second chamber. One or more gaskets (not shown) may be used to seal the MEA 10 to inhibit leakage of the fluid(s). As will be appreciated, multiple MEAs 10 may be stacked in parallel, with the first bipolar plate 14 of one MEA serving as the second bipolar plate 16 of a second MEA, for example. Two or more MEAs 10 may additionally, or alternatively, be stacked in series.

The MEA of FIG. 1 is configured for use in a fuel cell device. The fuel 38 may be (predominantly) hydrogen gas. The first catalyst layer 22 converts the hydrogen to hydrogen or hydronium ions, which pass through the proton-permeable membrane 12. The membrane 12 is configured to enable protons (H$^+$) to travel from the anode 26 to the cathode 28, while preventing the free electrons e$^-$ from traveling through the membrane.

Hydrogen ions reaching the second catalyst layer 24 combine with oxygen (e.g., in air) 46 to form water 48, which is drawn out of the second chamber as the air 46 is replenished. Electrons, generated by the ionization of hydrogen, pass along the conductive path 30 between the electrodes and charge the conductive path to charge a load cell 50. The process can be represented by the reactions:

$$2H_2 - 4e \rightarrow 4H^+$$

$$4H^+ + O_2 + 4e \rightarrow 2H_2O$$

Figure 2:
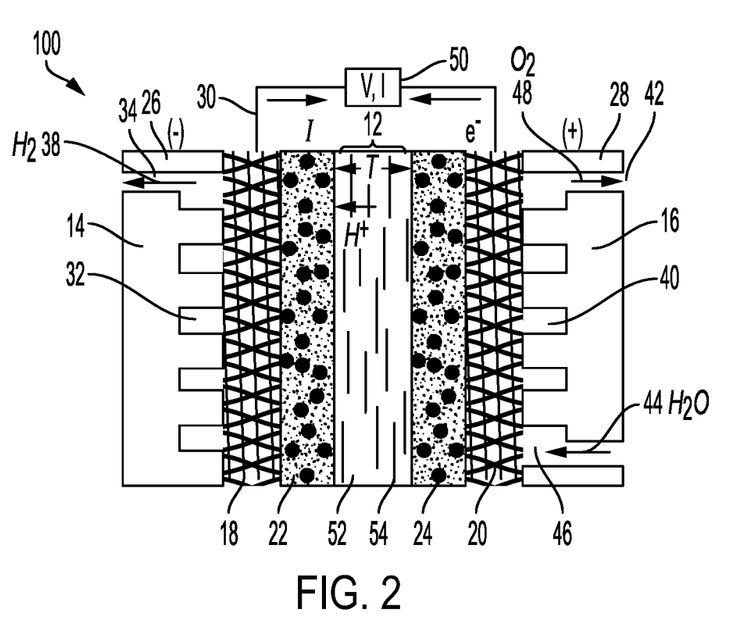
FIG. 2 is a schematic cross sectional view of a membrane electrode assembly in accordance with another aspect of the exemplary embodiment.

FIG. 2 illustrates an MEA 100 configured for use in an electrolyzer device. In this embodiment, the reactions are essentially reversed. Water 46 is fed to the anode chamber 40, where it is converted to hydrogen ions and oxygen by the second catalyst layer 24. The hydrogen ions pass through the proton-permeable membrane 12 to the cathode chamber 32. Oxygen gas exits the anode chamber 40 via a port 42 and may be collected in a suitable vessel (not shown). Hydrogen ions reaching the catalyst layer 22 are reduced to hydrogen gas 38, which passes out of the chamber 32 through a port 34 and may be collected in a suitable vessel (not shown). Electrons, generated by the decomposition of water, pass along the conductive path 30 between the electrodes 28, 26 via the load cell 50, which provides additional current to drive the reaction. The process can be represented by the reactions:

$$2H_2O - 4e \rightarrow 4H^+ + O_2$$

$$4H^+ + 4e \rightarrow 2H_2$$

In the MEA 10, 100, the first and second bipolar plates 14, 16 may be formed from a corrosion resistant metal or alloy, such as stainless steel, aluminum alloys, titanium alloys, nickel alloys, copper alloys, and metal-based composites. Carbon-based materials, such as graphite, buckminster fullerene, or composites containing carbon materials may also be used. In one embodiment, the bipolar plates 14, 16 are electrically conductive and serve as extensions of the anode and cathode 26, 28. The bipolar plates 14, 16 may be etched or otherwise channeled to provide flow distribution channels.

The gas diffusion layers 18, 20 may be multiple plies of carbon paper, woven carbon cloths, non-woven carbon fiber, mesh, or the like. The carbon paper, cloth or web may be modified with a particulate material either embedded within the substrate or coated onto the planar faces, or a combination of both. The particulate material may be a mixture of carbon black and a polymer such as polytetrafluoroethylene (PTFE) or polyvinylidene fluoride (PVDF). The gas diffusion layers 18, 20 may be between 100 and 300 μm thick. In one embodiment, the gas diffusion layers 18, 20 are electrically conductive. The gas diffusion layers serve to reduce hot spots and distribute the fuel (hydrogen or water).

The first and second electrodes 26, 28 may be formed from palladium, platinum, carbon (e.g., graphite), or other electrically-conductive material.

The first and second catalyst layers 22, 24 may include catalyst particles, which may be embedded in or supported on the electrode material and/or membrane 12, e.g., embedded in the same or a similar ionomer material to that used for the membrane 12. The catalyst may be a finely divided metal powder. The metal catalyst may be selected from (i) the platinum group metals (platinum, palladium, rhodium, ruthenium, iridium, and osmium), and/or (ii) gold or silver. Alloys or mixtures of catalytic metals with other metals or metal oxides are also contemplated. Examples of such other metals include ruthenium, molybdenum, tungsten, cobalt, chromium, nickel, iron, copper, and oxide thereof. The catalyst layers may also include additives to enhance deposition and adhesion of catalyst particles, such as polymer or ionomer binders or surfactants.

The polymer electrolyte membrane 12 includes a polymeric electrolyte material 52, serving as a solid matrix, and optionally-functionalized platelets 54. The exemplary membrane 12 is a single layer composite membrane in which the platelets 54 (not to scale) are dispersed in the polymeric electrolyte material 52 and are generally spaced from each other. The polymeric electrolyte material 52 may be anion permeable (e.g., proton-permeable), electrical insulating barrier material, including fluoropolymer-based ion permeable materials. Example fluoropolymers that are ion permeable include perfluorosulfonic acid (PFSA)-modified tetrafluoroethylene, such as DuPont's range of Nafion® polymers, e.g., Nafion® XL, 112, 115, 117, and 1110 and Solvay's Aquivion® polymers, available in powder, pellet, and dispersion forms, e.g., Aquivion® PW98 Aquivion® PW87S and Aquivion® PW79S powders, Aquivion® D72-25BS, Aquivion® D79-25BS and Aquivion® D98-25BS dispersions, and Aquivion® P98 pellets. In the case of Aquivion® dispersions, the polymer concentration is 25% and the solvent system is >99% water and is free of ethers. Nafion®-based solutions are available at various polymer concentrations, such as Nafion™ 510211 perfluorinated resin solution (5 wt. % polymer in a mixture of lower aliphatic alcohols, containing 45% water), and Nafion™ 527122 perfluorinated resin solution (20 wt. % polymer in mixture of lower aliphatic alcohols, containing 34% water). As an example, Nafion® can be extruded or cast into thin films by dissolving it in an aqueous and/or organic solvent, such as aqueous alcohol. Non-fluorinated, ion-permeable electrolyte materials, such as polymers containing phosphonate, sulfonate, or carboxylate groups, are also contemplated.

The platelets 54 have a high aspect ratio and are predominantly arranged in the membrane 12 such that their length (longest dimension) is generally aligned with a length L of the membrane and perpendicular to the direction of flow of the hydrogen ions through the membrane 12. The platelets 54 help to reduce undesirable gas crossover caused by permeation of hydrogen gas and oxygen gas through the membrane 12. The platelets 54 may be functionalized with one or more of: free radical scavenger (FRS) groups, ion (e.g., proton) conductivity enhancing (PCE) groups, and polymer binding groups.

The optionally-functionalized platelets 54 may be incorporated in the membrane material 52 in any suitable ratio, such as a ratio of platelets to membrane material by volume of at least 1:100 or at least 5:100, or at least 10:100, such as up to 1:1 or up to 1:2 or up to 1:3. In total, the platelets 54 may be at least 1 vol. % of the membrane 12, or at least 3 vol. %, or at least 5 vol. %, or at least 8 vol. %, or at least 10 vol. %, or up to 50 vol. %, or up to 40 vol. %, or up to 30 vol. %, or up to 20 vol. % of the membrane.

The polymer electrolyte membrane 12 may have a thickness T of at least 10 µm, such as at least 20 µm, or at least 40 µm, and may be up to 300 µm in thickness, or up to 100 µm, such as about 50 µm. A ratio of membrane length L to thickness T may be at least 10:1 such as at least 50:1 or at least 10,000:1.

Figure 3:
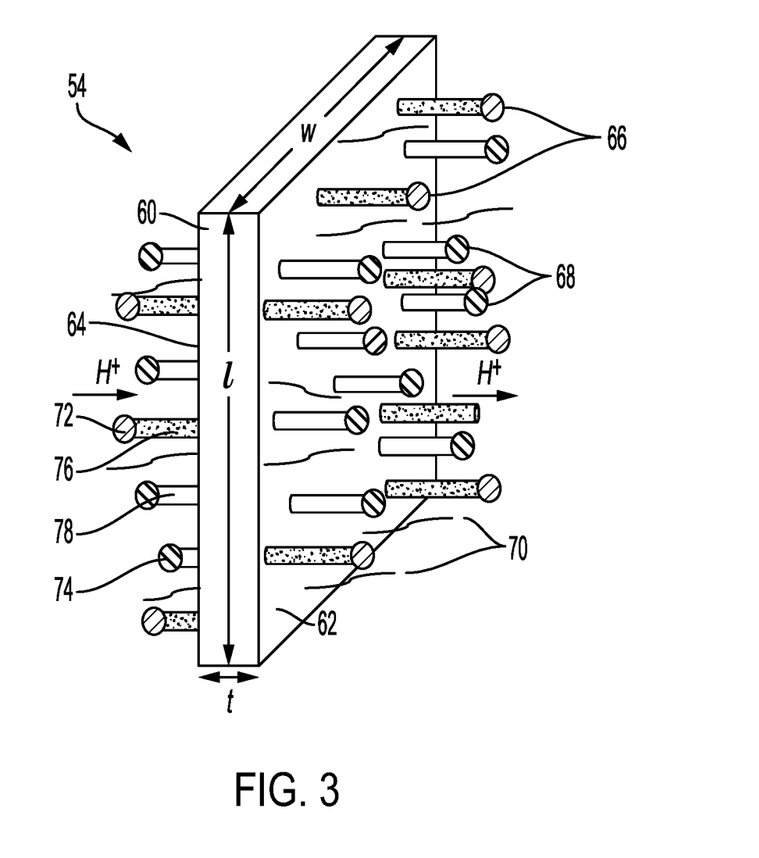
FIG. 3 is a schematic perspective view of an example platelet suited to use in the membrane electrode assembly of FIG. 1 or FIG. 2.

FIG. 3 schematically illustrates a single illustrative platelet 54 which may be used in the membrane 12 of MEA 10 or 100. The platelet has a planar body 60 which may be generally rectangular, as illustrated, or generally oval in shape, or a randomly-shaped flake. The body 60 defines first and second opposed, surfaces 62, 64 spaced by a thickness t (smallest dimension, determined as the mean thickness, averaged over the length l of the platelet). The surfaces 62, 64 are substantially planar. By "substantially planar," it is meant that variation in the thickness from the average thickness t is no more than 30%, or no more than 20%, or no more than 10%, over at least 60% or at least 70% or at least 80% or at least 90% of the platelet body.

A ratio of length/(longest dimension) of the platelet body to the thickness t of the platelet body may be at least 2:1 or at least 5:1 or at least 10:1, or up to 100:1, or up to 50:1, on average (mean for the platelets in the membrane), resulting in the platelet body 60 being substantially 2-dimensional. A width w of the platelet body (or the entire platelet 54) is less than or equal to the length l and greater than the thickness t, e.g., the width:thickness ratio is at least 2:1 or at least 5:1 or at least 10:1, or up to 100:1, or up to 50:1, on average (mean for the platelets in the membrane). A length:width ratio l:w may be at least 1:1 or at least 1.1:1 or up to 10:1, or up to 5:1.

The largest dimension of the platelet is generally large enough to prevent migration in the membrane, such as at least 1 nm, or at least 10 nm, or at least 100 nm, or at least 1 µm, or at least 10 µm, or at least 100 µm. For example, the platelet body length l and/or width w, on average (mean for the platelets in the membrane), may be at least 0.5 µm, such as at least 1 µm, or at least 5 µm, and may be up to 500 µm, such as up to 200 µm, or up to 50 µm, or up to 20 µm, or up to 15 µm, or up to 10 µm. The platelet body thickness t may be at least 0.01 µm, such as at least 0.1 µm, or at least 0.5 µm, and may be up to 5 µm, such as up to 2 µm, or up to 1.5 µm, or up to 1 µm.

The thickness T of the membrane 12 may be at least 5× or at least 10× the mean thickness t of the platelets and may be up to 100× the mean thickness t. The length L of the membrane 12 may be at least 5× or at least 10× the mean length l of the platelets and may be up to 100× the mean length l.

The platelets 54 are predominantly aligned in the same direction, specifically, oriented with their largest dimension l aligned generally parallel with the length dimension L of the membrane 12. By generally parallel, it is meant that the largest dimension l of the platelets, on average, is within ±20°, or within ±15° or within ±10°, of being parallel with the length dimension L of the membrane.

The platelet body 60, or at least a surface layer thereof, may be predominantly formed of clay (a hydrous aluminosilicate) or other metal oxide or ceramic oxide flake such as titania (predominantly $TiO_2$), manganese oxide (predominantly $MnO_2$), silica (predominantly $SiO_2$), zirconia (predominantly $ZrO_2$), graphene oxide, or mixture or mixed oxide thereof. Here, "predominantly" means a least 60 wt. %, or at least 80 wt. % of the specified oxide or mixture/mixed oxide. Desirably, the oxide is one which is inert to chemical interactions with the hydrogen ions and/or other ionic species.

Such platelet bodies 60 can have a positive effect on the membrane performance, with or without functionalization. They can serve to reduce gas crossover, stabilize the membrane structurally, and/or improve thermal stability. Ceramic oxides can also assist in water retention. Manganese oxide can decrease peroxide formation in the membrane.

With continued reference to FIG. 3, the body 60 may support, on at least one or both of its planar surfaces 62, 64, one or more moieties 66, 68, 70. The moieties may include functional groups which interact chemically with other species, and/or moieties 70 which interact physically, e.g., with the electrolyte material 52. The functional groups 72, 74 may be directly bonded to the platelet body, attached via a linker molecule 76, 78, and/or spaced from the body 60 by a polymer chain. Suitable linker molecules include two (or more) reactive species, one of which forms a chemical bond with the functional group, the other of which forms a chemical bond with the body. The reactive species may be located at ends of a long-chain organic molecule, such as a $C_6$ or higher, or $C_{10}$ or higher, hydrocarbon chain.

Moieties incorporating functional groups are illustrated at 66 and 68 (not to scale). By way of example, moieties 66 may incorporate or consist of free radical scavengers (FRS) 72. FRS are generally moieties which react preferentially with free radicals. For long-term use, FRS may be selected from those that are able to regenerate. FRS that are soluble in acidic aqueous medium tend to be washed out by generated water. However, by binding such FRS to the platelets, this problem can be avoided. FRS can be inorganic or organic. The free radicals may include hydroxyl groups and other intermediate radicals generated from hydrogen and oxygen. FRS can also be bonded to particles that are not platelets or substantially 2D. FRS groups can be bonded to fibers, rods, nanotubes, irregular, or approximately spherical particles. The irregular, or approximately spherical particles may have a ratio of maximum to minimum dimension of no more than 1.5:1. The particles may have at least one of a length, a width, and a thickness as described for the platelets, or may be smaller or larger in size.

In one embodiment, the FRS 72 include or consist of ceria, which is the oxide of cerium, usually in the form of $Ce_2O_3$ and $CeO_2$, corresponding to $Ce^{3+}$ and $Ce^{4+}$. $Ce^{4+}$ is able to oxidize peroxide free radicals and hydrogen, generating $Ce^{3+}$. Hydroxyl radicals can oxidize the $Ce^{3+}$ to $Ce^{4+}$, thereby regenerating the FRS. Derivatives of ceria may also be used. In one embodiment, the linker 76 may include ePTFE, which can be anchored on ceria by the catechol group. In addition to removing free radicals, ceria is also hydroscopic and thus can bond to stray water molecules in the membrane. Other metal and ceramic oxides, such as manganese oxide may alternatively or additionally be used as FRS 72.

The FRS 72 may additionally or alternatively include sulfonate groups which remove free radicals, particularly reactive oxygen species, such as hydroxyl and hydroperoxyl ($HO_2$) free radicals. These free radicals can initiate oxidative degradation of both the backbone of the polymer forming the membrane and the side chains that contain ionic groups that promote ion conduction.

Other example FRS 72 are derived from organic antioxidants such as hydroquinolines, hydroxylamine, and acrylated bisphenols. Examples include carbon centered radical scavengers, such as lactones (e.g., substituted benzofuranone). Such free radical scavengers also inhibit oxidation via chain termination. Under oxygen deficient conditions alkyl radical scavengers contribute significantly to the stabilization of the polymer. Acrylated bis-phenols are effective in oxygen deficient environments.

Additionally, or alternatively, the illustrated body 60 is functionalized, on at least one or both of its planar surfaces 62, 64, with moieties 68 (not to scale) including ion conductivity enhancing groups. In the case of a proton exchange membrane, these ion conductivity enhancing groups are proton conductivity enhancing (PCE) groups. Example PCE groups include amino acids (singly or as polypeptides), and sulfonic acid groups ($R-SO_3^-$, where R can be H, an aromatic group, and/or an aliphatic group, such as a $C_6$ or higher, or $C_{10}$ or higher, aromatic group or an aliphatic group), or other ion-conducting charged groups such as carboxylates or phosphonates. In the case of an anion exchange membrane, the ion conductivity enhancing groups are anion conductivity enhancing groups, e.g., quaternary amines, piperidinium, guanidinium, imidazolium, pyridinium, and other ion-conducting charged groups. The groups may be referred to in their protonated or un-protonated forms (e.g., sulfonic acid vs. sulfonate). The counterion to the charged conducting group may be a proton or another ion.

The body 60 may additionally support bonding groups, particularly physical entanglement groups 70. These may include straight chain or branched organic polymers with a number average molecular weight $M_n$ of at least 300, or at least 500, as determined by gel permeation chromatography. The entanglement groups 70 may be formed from the same long-chain molecules as described for the linking groups and/or similar to the polymer used as the membrane material 52. The entanglement groups 70 help to bind the platelets 54 to the membrane material 52 and reduce the opportunity for voids to occur between the platelets and the membrane material 52. Example polymers for use as physical entanglement groups 70 include optionally-functionalized PTFE. The bonding groups may also interact with the matrix via physical or chemical crosslinking or secondary bonding through crystallization.

Advantages of the platelet-containing membrane 12 include reduction in gas crossover and free radical based chemical degradation problems in Membrane Electrode Assembly (MEA) in proton exchange membrane (PEM) fuel cell and PEM water electrolyzers. The membrane improves safety and durability of the $H_2$ conversion systems while enabling thinner membranes that provide for improved conversion efficiencies with reduced cost.

In some embodiments, the membrane 12 may also include functionalized nanoparticles (not shown). These are particles of up to 10 nm in width and which are generally spherical, with an aspect ratio of maximum to minimum dimensions of close to 1, e.g., from 1.2:1 to 1:1. The nanoparticles may be formed from ceria or other metal oxide or ceramic oxide. Functionalization can be achieved with one or more of the moieties 66, 68, 70 described above. In some embodiments, one or more of the moieties 66, 68, 70 are on the platelets while a different one or more of the moieties 66, 68, 70 are on the nanoparticles. Mixtures of particle geometries and functional groups are also contemplated.

Figure 4:
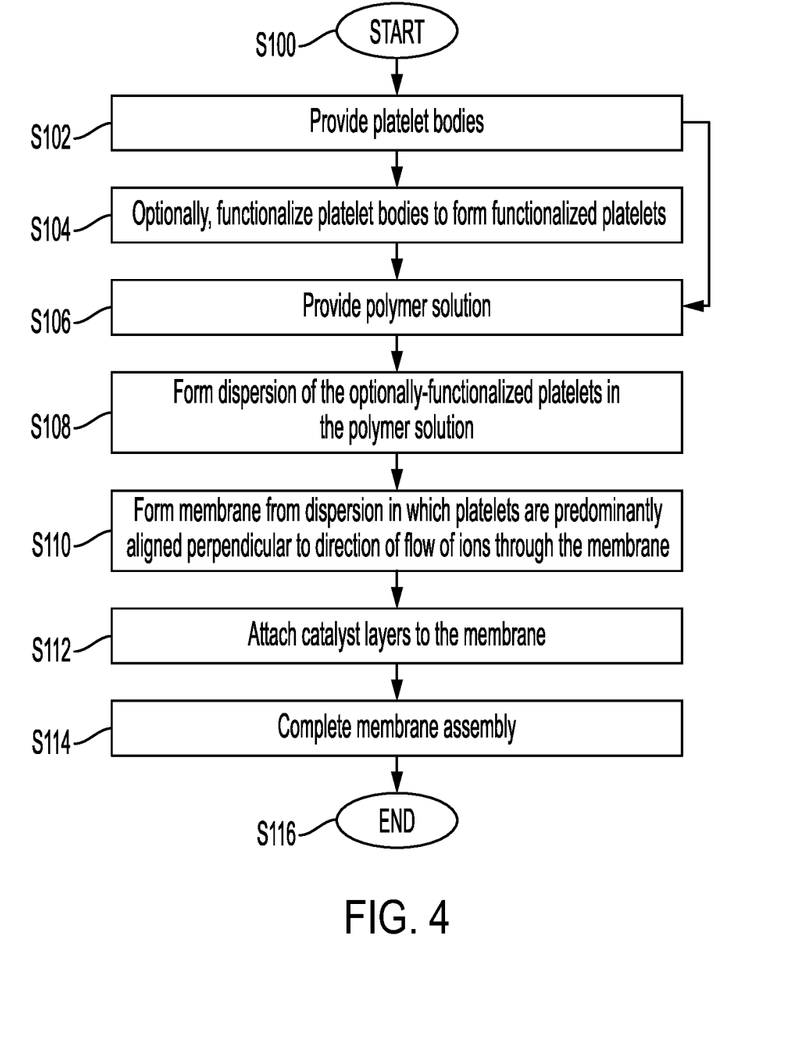
FIG. 4 illustrates a method of making of a membrane electrode assembly in accordance with another aspect of the exemplary embodiment.

FIG. 4 illustrates an example method of preparation of a polymer electrolyte membrane 12 and membrane electrode assembly 10. The method begins at S100.

At S102 platelet bodies 60 are provided, e.g., formed or acquired. For example, high aspect ratio particles may be synthesized or obtained commercially. An example synthesis method is molten salt synthesis. See, for example, Liu, et al., "Synthesis of Micron-Scale Platelet $BaTiO_3$," J. Am. Ceram. Soc., 90 [4] 1323-1326 (2007). Readily-available high aspect ratio particles, such as clay, aluminum oxide, white sapphire (e.g., sold under the tradename RonaFlair® by Merck KGaA), mica, which may be coated with a wafer-thin layer of metal oxide (e.g., sold under the tradename Iriodin® by Merck KGaA), and manganese oxide may be used. To prepare platelet bodies for functionalization, they may be rinsed with solvent and dried. A desired particle size range may be obtained by sedimentation techniques or by sieving. For example, particles can be passed through a 70 mesh sieve, then 140 mesh sieve and a 400 mesh sieve, and even smaller mesh sizes may be used.

At S104, the platelet bodies are optionally provided with one or more moieties 66, 68, 70 on their surfaces to form functionalized platelets 54. The high aspect ratio platelets may be functionalized to attach chemical groups facilitating the bonding to the polymer, for example, by adding silane agents to provide —OH groups on the surface of the platelets. Another benefit of these groups is to reduce voids at the particle-matrix interface which may lead to increased gas permeation, or increased ionic resistance.

One example method includes functionalizing high aspect ratio manganese oxide platelets with silane agents to chemically attach oligomeric or polymeric groups with can entangle with the matrix polymer and enhance conductivity, proton conductivity in the case of cation exchange membranes, or hydroxide conductivity in the case of anion exchange membranes. In another embodiment, low molecular weight additives with multiple functional groups, such as amine, nitro and/or hydroxyl may be used, which may interact with zeolite platelets and the polymer matrix through ionic or covalent interactions.

Other functional groups which may be attached include sulfonate groups ($R-SO_3^-$), carboxylates ($R-CO_2^-$), phosphonates ($R-PO_3^{2-}$), and other conjugate bases of an acid. Here, R is an organic group that attaches the functional group to the rest of the molecule, such as an aromatic group, an aliphatic group, and/or a fluorinated group. To maintain charge neutrality, the ionic group is associated with counterions of opposite charge, such as protons, hydronium ions, and other cations. In the case of anion exchange materials, the groups can be conjugate acids of a base such as quaternary ammonium, guanidinium, piperidinium, pyridinium, imidazolium, or other positively charged group. The oligomeric or polymeric functional groups may contain one or more ionic groups. In some embodiments, the functional groups may not be oligomeric or polymeric.

A silane linkage may be used to directly bond the functional group to the platelet, or it may act as a site for further reaction to attach the functional group. For example, acrylo silanes, methacrylo silanes, amino silanes, glycidyl silanes, or other silanes can be used to couple functional groups to the platelet surface through a variety of reactions such as polymerization, radical polymerization, condensation reactions, ring-opening reactions, and other means of bond formation. The silane group may contain a chloride, fluoride, bromide, iodide, halide, or other leaving group to facilitate bond-formation with the platelet. For example, a chlorosilyl group may be used.

Once the functionalized particles are prepared, they are dried, blended with a matrix polymer or ionomer, and formed into a membrane.

At S106 a polymer solution is provided, e.g., formed or acquired. A polymer solution may be formed by dissolving the polymer electrolyte material in a solvent using a suitable mixing method, optionally with heating and/or ultrasonically treating the polymeric electrolyte material 52, or a precursor therefor, in a mixture of lower alcohols and water to a suitable temperature to melt the polymer. The polymer electrolyte material can also be melt-processed instead of being dissolved in a solvent. The polymeric electrolyte material 52 may be in the form of granules, pellets, powder, or other suitable form. In one embodiment, the polymer is composed mainly of a polytetrafluoroethylene (PTFE) backbone with side chains containing ether groups and a sulfonic acid or perfluorosulfonic acid unit at its end, such as Nafion® polymer, which can be cast into thin films by dissolving in an aqueous alcohol mixture, e.g., at 250° C., in an autoclave or can be extruded or blown from the dissolved or molten state.

For example, Nafion® polymer is dissolved in a solvent, such as n-methyl pyrrolidone or dimethylformamide, at a weight ratio of about 1:2 to 1:5 polymer:solvent, with mixing, e.g., by magnetic stirring or planetary or centrifugal mixing.

At S108, a dispersion of the optionally-functionalized platelets in the polymer solution is formed. In one embodiment, the optionally-functionalized platelets are combined with a dispersion of the polymer material in a suitable solvent, prior to heating the polymer dispersion, i.e., prior to performing S106. In another embodiment, the optionally-functionalized platelets are combined with the polymer solution formed at S106. In one embodiment, the optionally-functionalized platelets are added stepwise to the polymer solution. For example, the platelets are added in three steps, one third of it each time, while mixing in a planetary mixer for 2 minutes in between steps. The mixing time when the platelets are added is minimized to avoid breaking of the high aspect ratio platelets. The platelet to polymer loading can be varied. For example, the platelet concentration may be 1-10 wt. %, e.g., about 6-8 wt. % of the polymer solution.

In an alternative embodiment, the platelets may be added to the solvent before dissolving the matrix polymer. Optionally, the membrane solution may be filtered and/or degassed before forming into a membrane.

At S110, the dispersion of the optionally-functionalized platelets in the polymer solution is extruded, doctor blade cast, tape cast, drop cast, and/or processed by another method which imparts shear as the dispersion is formed into a solid membrane 12 (or into a sheet from which multiple membranes are cut). The formation method is thus selected such that the platelets 54 are predominantly aligned in the same direction, specifically, oriented in the extrusion direction, with their largest dimension l aligned generally parallel with the length dimension L of the membrane 12. The thickness and shear stresses experienced by the membrane can be manipulated by the conditions and equipment used to form the membranes.

The membranes are formed and dried, e.g., at atmospheric pressure or under partial vacuum, and at ambient or elevated temperature. A solvent evaporation temperature is based on the solvent selected. For example, evaporation at 120-150° C. at about 101325 Pascal (1 atm), for 1-72 hrs, or 50-120° C. at less than 101325 Pascal (1 atm) for 1-72 hrs are suitable ranges of conditions for many solvents. Conditions are selected to be below the boiling point of the solvent at a given pressure to minimize bubbling. Polymer membranes can be formed on a substrate, such as hydrophobized glass or foil, or they can be made to be free-standing in a process such as blow molding.

In one embodiment, the membrane may be further annealed at above the glass transition temperature of the polymer for 30 minutes, or longer, such as up to 72 hours. If prepared on a substrate, the polymer can be removed prior to or after annealing. Annealing above the glass transition temperature of the matrix polymer promotes polymer flexibility, which improves wetting of the particles by the polymer, improving gas barrier and ionic conductivity properties.

At S112, catalyst layers 22, 24 are attached to the membrane 12. In one embodiment, the membrane 12 and catalyst layers 22, 24 are formed in a coextrusion process, as described, for example, in above-mentioned U.S. Pub. No. 20200212466. The catalyst layers 22, 24 and membrane may be formed from the same polymer material 52, the catalyst layers being distinguished from the membrane in that the catalyst layers include catalytic material and are free from platelets 54, while the membrane 12 includes platelets 54 but is free from catalytic material.

At S114, a membrane electrode assembly 10 (or stack of membrane assemblies) is formed by clamping or otherwise sealing together the membrane 12, first and second bipolar plates 14, 16, optional first and second gas diffusion layers 18, 20, first and second catalyst layers 22, 24, and first and second electrodes 26, 28, e.g., with suitable gaskets positioned between the bipolar plates, and connecting the electrodes with a current source or load 50.

The method ends at S116.

In use, the exemplary membrane with shear-aligned 2D planar platelets 54, oriented in the extrusion direction, is able to reduce gas crossover in PEMFCs and PEM electrolyzers. Chemical degradation is reduced by surface functionalizing the 2D gas blocking platelets 54 with free radical scavenger (FRS) groups 66. FRS migration in the polymer network is reduced since the FRS are chemically bonded to the surface of the relatively immobile 2D platelets. Additionally, the 2D platelets 54, when functionalized with chemical groups 68, can increase the proton conductivity of the polymer network.

In a fuel cell 10, for example, hydrogen gas 38, or other gaseous source of hydrogen, such as a hydrocarbon gas, e.g., methane, is pumped through inlet 34 into chamber 32, where it is catalyzed to form hydrogen ions and free electrons. The electrons pass along path 30 between electrodes 26, 28, and charge the load cell 50 and/or supply electricity to another device. Residual, unreacted hydrogen exits through outlet 36 and may be recirculated to inlet 34. A source of oxygen, such as air, enters chamber 40, via inlet 44, where it reacts with hydrogen ions to produce water 46. The water generated in chamber 40 exits the chamber through outlet 42. The combination of hydrogen ions and oxygen ions is an exothermic reaction, and the heat generated in the reaction may be used for heating or for electrical energy production as well.

In an electrolyzer 100, for example, water 46 is pumped through inlet 44 into chamber 40 where it is electrolyzed at the anode 28/bipolar plate 16 to form hydrogen gas and oxygen. The hydrogen gas is catalyzed by the catalyst layer 24 to form hydrogen ions which pass through the membrane 1 and are catalyzed by catalyst layer 22 to form hydrogen gas. Hydrogen gas, generated in chamber 32 is collected as it exits the chamber through outlet 34. The catalysts in the layers 24 and 26 promote the electrolysis process to enable the fuel cell 10 to generate hydrogen molecules from water while consuming less electrical power than is required to electrolyze water in the absence of the catalyst.

The MEA 10 can also be used in a generic electrolyzer, fuel cell, or electrochemical device, where it is advantageous to separate fluids or gases at either electrode of the device, or where the membrane may be exposed to degradation by radicals. In a generic device, specific reactants, products and catalysts are not specified. Reactants may be the same as products as in the case of an electrochemical pump.

The exemplary MEA 10 finds particular use in power sources for road vehicles, space vehicles, and for home and industrial electrical power generation.

The exemplary MEA 100 finds particular use when coupled to an intermittent power source such as a wind turbine or solar power array. The MEA electrolyzes hydrogen using excess electricity provided by the power source 50 when the power source is operational. The MEA 100 or MEA 10 consumes the hydrogen to produce electrical power when the intermittent power source is inoperative.

Example Membrane Formation Method

Functionalized clay platelets are incorporated in polymer dispersion of Nafion® ionomer (5 wt. %) in solvent (deionized water and anhydrous ethanol (Carlo Erba) at about 7 parts by weight platelets to 100 parts by weight polymer solution under ultrasound. The functionalized clay platelets are added at a polymer:platelet ratio of 2.3:1. The mixture is heated to 50° C. to form a dispersion of platelets in a polymer solution and the dispersion is extruded to form the membrane.

The membrane has a thickness of about 50 microns. Gas crossover, as compared to a conventional Nafion® membrane of about 250 microns, is about 70% less. Membrane degradation is about 60% slower than for the conventional Nafion® membrane. Risk of explosion, due to gas crossover, is substantially eliminated.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A polymer electrolyte membrane comprising:
   an ion-conducting polymeric electrolyte material; and
   platelets, distributed through the polymeric electrolyte material, the platelets having an aspect ratio of length to thickness of at least 2:1, and wherein the platelets are aligned generally parallel to a length of the membrane and perpendicular to a direction of flow of hydrogen ions when flowing through the membrane.

2. The polymer electrolyte membrane of claim 1, wherein the ion-conducting polymeric electrolyte material comprises a fluoropolymer.

3. The polymer electrolyte membrane of claim 1, wherein a volume ratio of platelets to membrane material is at least 1:100.

4. The polymer electrolyte membrane of claim 3, wherein a volume ratio of platelets to membrane material is at least 1:10.

5. The polymer electrolyte membrane of claim 1, wherein the platelets have an aspect ratio of length to thickness of at least 5:1.

6. The polymer electrolyte membrane of claim 1, wherein the platelets have a longest dimension of at least 10 nanometers, on average.

7. The polymer electrolyte membrane of claim 6, wherein the platelets have a longest dimension of at least 5 micrometers.

8. The polymer electrolyte membrane of claim 1, wherein the platelets have a longest dimension of no more than 50 micrometers, on average.

9. The polymer electrolyte membrane of claim 1, wherein the platelets are predominantly formed, at least on a surface thereof, of a metal oxide, ceramic oxide, or mixture thereof.

10. The polymer electrolyte membrane of claim 9, wherein the metal oxide, ceramic oxide, or mixture thereof is selected from the group consisting of clay, titania, manganese oxide, silica, zirconia, graphene oxide, mixtures thereof, and mixed oxides thereof.

11. The polymer electrolyte membrane of claim 1, wherein the platelets each include a body which is functionalized with moieties selected from the group consisting of free radical scavengers, ion conductivity enhancing groups, entanglement groups, and combinations thereof.

12. The polymer electrolyte membrane of claim 11, wherein the moieties include at least one of free radical scavengers and ion conductivity enhancing groups, the at least one of the free radical scavengers and ion conductivity enhancing groups being spaced from the body by linking groups.

13. The polymer electrolyte membrane of claim 11, wherein the moieties comprise free radical scavengers selected from the group consisting of ceria, sulfonate groups, hydroquinolines, hydroxylamine, acrylated bisphenols, and combinations thereof.

14. The polymer electrolyte membrane of claim 11, wherein the moieties comprise ion conductivity enhancing groups selected from the group consisting of amino acids, sulfonic acids, carboxylates, phosphonates, ion-conducting charged groups, quaternary ammonium groups, and groups based on imidazolium, guanidinium, piperidinium, and pyridinium.

15. The polymer electrolyte membrane of claim 11, wherein the moieties comprise entanglement groups which assist in physically binding the platelets to the membrane material.

16. The polymer electrolyte membrane of claim 1, further comprising particles, present in the polymeric electrolyte material, other than the platelets, and wherein at least one of the particles and the platelets are functionalized with moieties selected from the group consisting of free radical scavengers, ion conductivity enhancing groups, entanglement groups, and combinations thereof.

17. A membrane electrode assembly comprising:
   the polymer electrolyte membrane of claim 1; and
   first and second electrodes, spaced by the membrane.

18. The membrane electrode assembly of claim 17, further comprising:
- first and second catalyst layers for catalyzing reactions adjacent the membrane, and
- optionally, first and second gas diffusion layers, spaced from the membrane by the first and second catalyst layers, respectively.

19. An electrolyzer, fuel cell, electrochemical device, or electrochemical pump comprising the membrane electrode assembly of claim 17.

20. A method of forming the polymer electrolyte membrane of claim 1, comprising:
- combining platelets with a polymer in solution to form a dispersion, the platelets having an aspect ratio of length to thickness of at least 2:1; and
- forming a polymer electrolyte membrane from the dispersion, including applying shear to the dispersion to align the platelets generally parallel to a length of the membrane.

21. A membrane electrode assembly comprising:
- a polymer electrolyte membrane, a ratio of a length of the membrane to a thickness of the membrane being at least 10:1; and
- first and second electrodes, spaced by the membrane;

the membrane comprising:
- an ion-conducting polymeric electrolyte material; and
- platelets, distributed through the polymeric electrolyte material, the platelets having an aspect ratio of length to thickness of at least 2:1, and wherein the platelets are aligned generally parallel to the length of the membrane.

* * * * *